March 11, 1958 R. J. MOSS 2,826,133
HOE DRILL STUBBLE REMOVER
Filed March 22, 1956 2 Sheets-Sheet 1
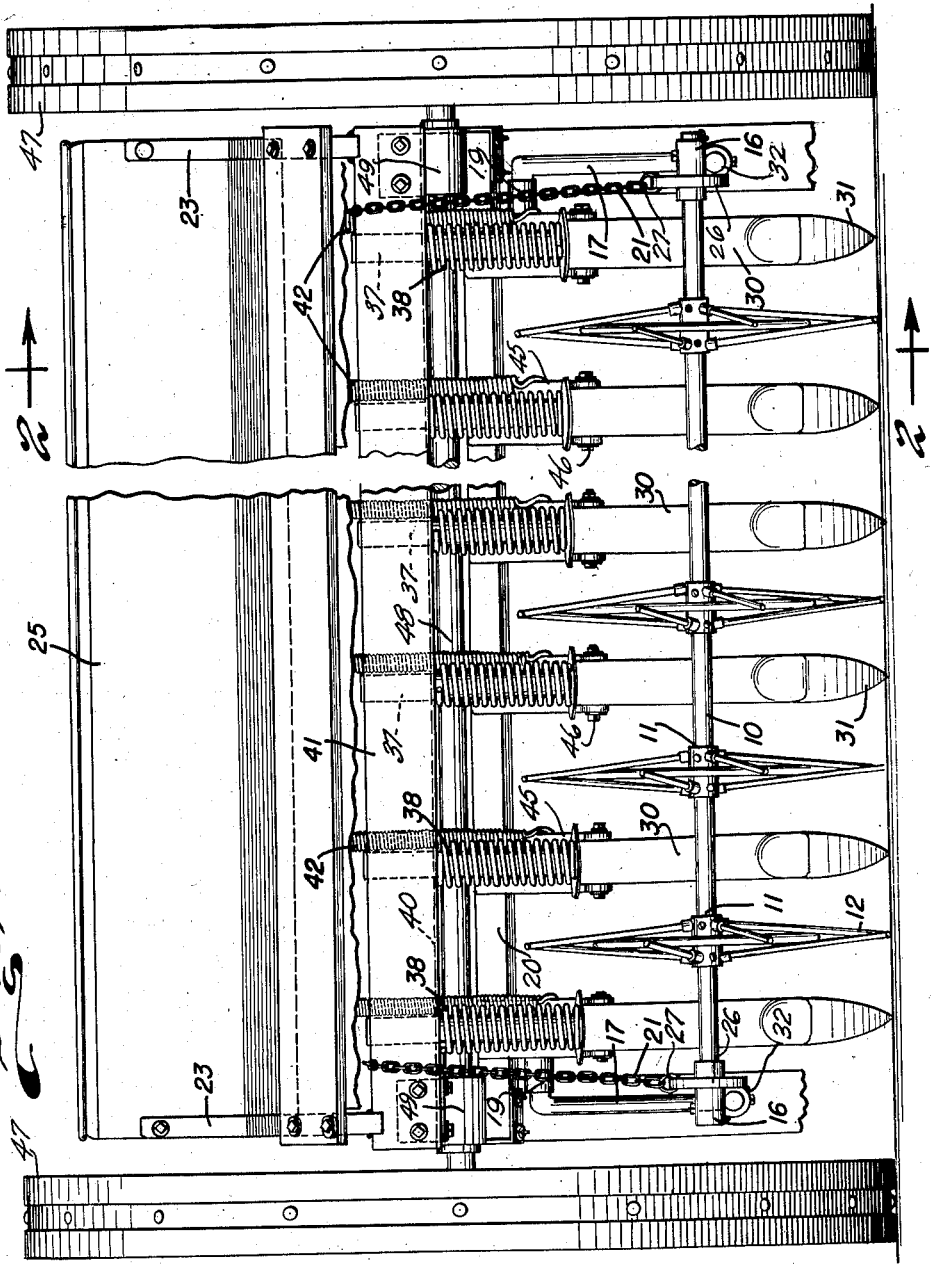
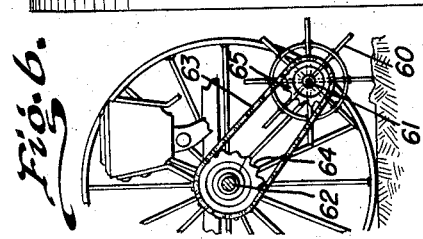
INVENTOR.
Robert J. Moss
BY Victor J. Evans & Co.
ATTORNEYS March 11, 1958 R. J. MOSS 2,826,133
HOE DRILL STUBBLE REMOVER
Filed March 22, 1956 2 Sheets-Sheet 2
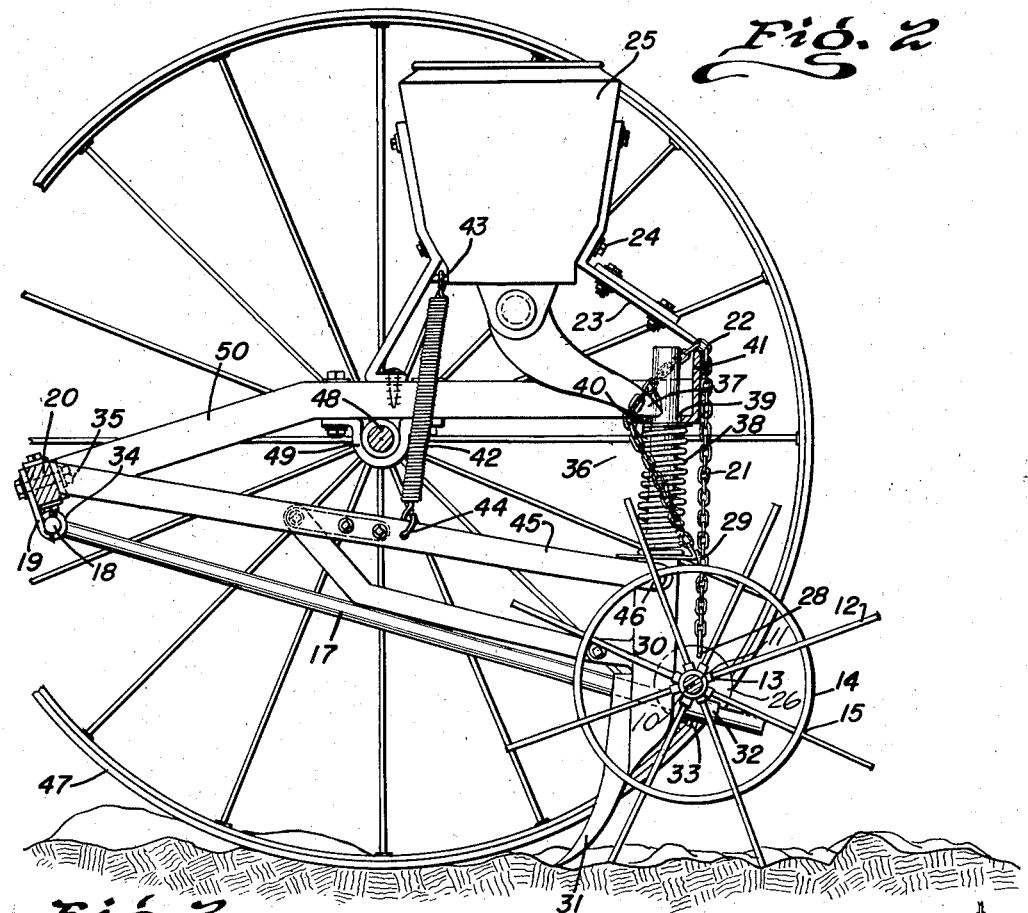
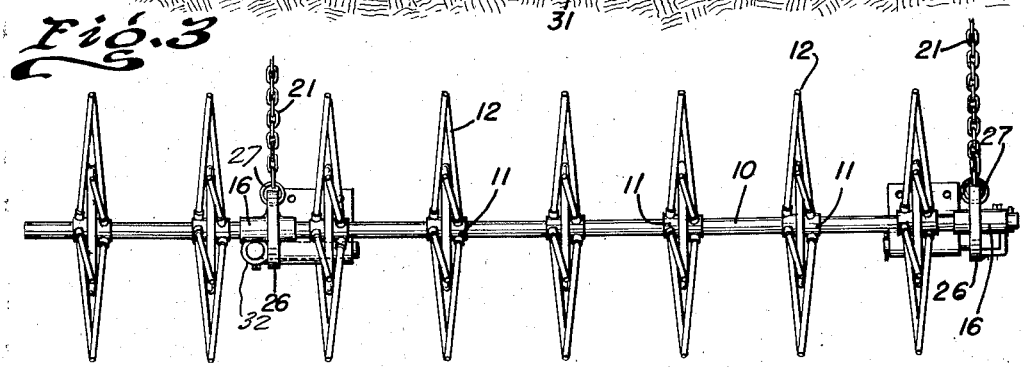
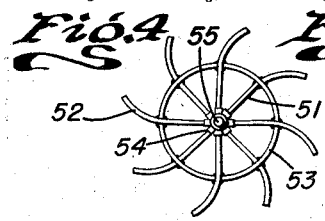
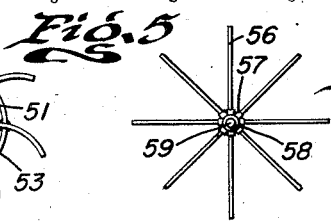
INVENTOR.
Robert J. Moss
BY Victor J. Evans & Co.
ATTORNEYS

United States Patent Office 2,826,133
Patented Mar. 11, 1958

2,826,133

HOE DRILL STUBBLE REMOVER

Robert J. Moss, Hoxie, Kans.

Application March 22, 1956, Serial No. 573,122

1 Claim. (Cl. 97—194)

This invention relates to agricultural implements particularly of the type used for seeding, and in particular to a plurality of wheels having extended radially disposed spokes wherein, with the wheels mounted on a shaft and positioned between hoes of a drill, the wheel are rotated by engagement of the ends of the spokes with the ground and stubble and the like raked by the hoes and accumulating against the forward surfaces of the hoes is pulled through by the tines or spokes of the wheels and deposited at the rear whereby the area between the boots or hoes is maintained in a clean condition.

The purpose of this invention is to provide an attachment adapted to be mounted on a drill for working stubble and other debris through the spaces between the hoes or drills as the drill is used.

After harvesting corn from a field the soil is worked with a disc harrow before seeding and substantially all corn stalks, trash, and the like remaining on the field are raked by the hoes of a seed drill with the result that the stubble and other trash accumulates against the leading surfaces of the hoes making it difficult to deposit the grain evenly throughout the field. With this thought in mind this invention contemplates an attachment for a drill in which rotating elements of the attachment pull stubble, trash, and other debris through the spaces between the boots or shovels of the drill so that the boots of the drill are maintained in a clean condition continuously.

The object of this invention is, therefore, to provide means for removing stubble, trash and other debris from the boots or hoes of a drill as the drill is in operation.

Another object of the invention is to provide an attachment for removing stubble, trash and the like from a drill in which the attachment is adapted to be installed on drills now in use.

A further object of the invention is to provide a stubble removing attachment for a drill in which the attachment is of a simple and economical construction.

With these and other objects and advantages in view the invention embodies a shaft rotatably and adjustably mounted on a grain drill and a plurality of wheels having radially disposed tines or fingers mounted on the shaft and positioned between the boots or hoes whereby with the shaft suspended so that extended ends of the tines engage the ground the wheels are rotated as the drill is drawn forwardly and trash accumulating against the hoes thereof is drawn through the areas between the hoes and deposited to the rear of the drill.

Other features and advantages of the invention will appear from the following description taken in connection with the drawings, wherein:

Figure 1 is an elevational view looking toward the rear of a grain drill showing the position of the stubble and trash removing attachment with the shaft of the attachment carried by arms pivotally mounted on the frame of the drill and with the wheels having radially disposed tines or fingers positioned between the boots or hoes of the drill, part of the drill being broken away.

Figure 2 is a longitudinal section through the drill taken on line 2—2 of Fig. 1.

Figure 3 is an elevational view showing the stubble and trash removing elements or wheels mounted in spaced relation upon a shaft and showing ends of the shaft rotatably mounted in bearings from which chains extend, the parts being shown on a reduced scale.

Figure 4 is a side elevational view of one of the stubble and trash removing or raking elements showing a modification wherein the radially disposed tines or spokes are provided with arcuate ends.

Figure 5 is a view showing one of the wheels having radially disposed tines or spokes illustrating a further modification wherein a supporting band or rim for supporting the spokes is omitted.

Figure 6 is a longitudinal section through the rear portion of the machine with the parts shown on a reduced scale illustrating a modification wherein the shaft on which the tines are mounted is rotated from the axle of the drill by the chain.

Referring now to the drawings wherein like reference characters denote corresponding parts the stubble and other trash removing attachment of this invention includes a shaft 10, wheels having hubs 11 with tines or rods 12 extended from bosses 13 on the outer surfaces of the hubs and with the rods supported with a circular member or band 14 which is secured to the tines, such as by welding, as indicated at the point 15, bearings 16 mounted on the ends of arms 17 pivotally connected by pins 18 to plates 19 adapted to be mounted on a cross bar 20 of a drill, and chains 21 attached to and extended upwardly from the bearings and adapted to be attached to the frame of the drill.

The bearings 16 in which the shaft or shafts 10 are rotatably mounted are provided with transversely disposed flanges 26 and the chains 21 are provided with eyes 27 that are secured in openings 28 in the flanges, as shown in Fig. 2. The ends of the chains are fastened over hooks and by changing from one link to another the elevation of the shaft 10 and tines 12 may be adjusted. The extended ends of the chains extend to hooks 29 extended from upper ends of boots 30 through which grain drops to trenches or furrows formed by the hoes 31.

The bearings 16 are provided with sockets 32 through which the bar 17 extends and the sockets are retained in adjusted positions on the bar with screws 33. The upper ends of the bars 17 are pivotally mounted by the pins 18 in eyes 34 on lower ends of the plates 19 which are secured by bolts 35 to the cross bar 20.

The shaft 10 may extend continuously across a drill or the shaft may be provided in two sections with one of the bearings 16 positioned at the center of the drill and with additional bearings positioned at the ends for supporting ends of the shaft. The shaft may, therefore, be divided into any suitable number of sections and the wheels carrying the tines 12 are adapted to be adjusted to positions on the shafts so that the wheels are mounted substantially midway between the boots or hoes.

Spouts 36 extended downwardly from the seed hopper 25 carry the grain through tubes 37 and springs 38 to the boots 30 through which the grain is carried to the trenches following the hoes. The tubes 37 extend through openings 39 in horizontally disposed legs 40 of angle bars 41. The boots are urged upwardly by springs 42, upper ends of which are secured in eyes 43 at the lower end of the hopper 25 and the lower ends of which are secured in openings 44 in bars 45 extended forwardly from the cross bar 20 and positioned with outer ends thereof pivotally connected by pins 46 to upper parts of the boots.

The seed hopper assembly including the spouts, boots, and shovels is conventional.

The drill is provided with wheels 47 that are rotatably mounted on a shaft 48 and the shaft is rotatably mounted with bearings 49 in a frame 50 from the forward end of which a tongue or hitch extends.

In the design illustrated in Fig. 4 wheels including tines 51 having arcuate outer ends 52 and supporting bands 53, through which the tines extend are provided with hubs 54 that are adapted to be mounted on a shaft such as the shaft 55. The wheels are similar to those shown in Figs. 1, 2, and 3, except that the extended ends of the tines are curved to facilitate picking up and pulling the trash through the areas between the boots or hoes.

In the design illustrated in Fig. 5 tines 56 extend from bosses 57 on a hub 58 and the hub is mounted on a shaft 59, similar to the shaft 10. The raking device shown in Fig. 5 is also similar to that shown in Fig. 2 except that the supporting band, such as the band 14, is omitted.

As illustrated in Fig. 2 tines 12 rotate in a counter clockwise direction as the drill is drawn forwardly and with the wheels drawn by the tines and bands rotating in a counter clockwise direction trash attempting to accumulate before the hoes 31 is drawn through the hoes and discharged to the rear of the drill. By this means the hoes are maintained in a clean condition and the possibility of stopping the drill to remove trash from the boots or hoes is obviated.

Although the tines rotate freely with the ends penetrating the ground as the drill moves forwardly the tines may be rotated by the power take-off of the drill or tractor, or, as illustrated in Fig. 6, tines 60, which may be secured, such as by welding, directly to the shaft or a hub thereon are mounted on a shaft 61 which is driven from an axle 62 of the drill by a chain 63 which is trained over a sprocket 64 on the axle 62 and also over a sprocket 65 on the shaft 61. The chain and sprockets may be located at both ends of the drill or at other suitable points, or only a single chain may be used.

The elevation of the shafts 10 and 61 may also be adjusted by a hand lever or levers instead of the chain 21 or by other suitable means.

The wheels or hubs may be provided with any suitable number of tines and the tines may be of any suitable shape.

The hoe drill stubble remover of this invention is designed to enable the hoe drill to operate more efficiently on trashy ground as the trash is pulled through between the hoes while the drill is in operation.

It will be understood that modifications, within the scope of the appended claim, may be made in the design and arrangement of the parts without departing from the spirit of the invention.

What is claimed is:

In combination with a drill of the type having a cross bar, a frame, an axle, and ground engaging wheel members on said axle, a trash removing attachment for said drill comprising a shaft having a sprocket thereon, a sprocket on the drill axle, a chain trained over said sprockets for driving said shaft, plates connected to the cross bar of the drill, eyes on the lower ends of said plates, arms pivotally connected to the eyes on said plates, a plurality of wheels having hubs mounted on said shaft, said wheels being adjustable on said shaft whereby the wheels can be selectively shifted laterally along the shaft, a plurality of bosses on the outer surfaces of said hubs, tines extending from said bosses, said tines being arranged in opposed inwardly converging relation with respect to each other, a circular band secured to said tines, bearings rotatably receiving the ends of said shaft, said bearings being provided with flanges having openings therein, said bearings having sockets receiving said arms, chains provided with eyes on an end thereof engaging said openings and said chains providing an adjustable support for the shaft, hooks connected to the other ends of said chains and adapted to be connected with said frame, said tines adapted to pick up and pull trash through the areas between the boots or hoes of the drill so that the hoes are maintained in a clean condition and whereby the necessity of stopping the drill to remove trash from the boots or hoes is eliminated.

References Cited in the file of this patent
UNITED STATES PATENTS

| | | |
|---|---|---|
| 19,010 | Baker | Jan. 5, 1858 |
| 617,454 | Whittier | Jan. 10, 1899 |
| 1,229,342 | Steele et al. | June 12, 1917 |
| 2,732,785 | Kleppe | Jan. 31, 1956 |